United States Patent [19]

Mosciatti et al.

[11] 3,817,469

[45] June 18, 1974

[54] SELF-POSITIONING REEL LATCHING HUB

[75] Inventors: Roger Mosciatti, Coram; Thomas P. Foley; John J. Buyaskas, both of Huntington, all of N.Y.

[73] Assignee: Bucode, Inc., Hauppauge, N.Y.

[22] Filed: May 11, 1973

[21] Appl. No.: 359,451

[52] U.S. Cl. .............................................. 242/68.3
[51] Int. Cl. .............................................. B65h 17/02
[58] Field of Search ..................... 242/68.3, 72, 72.1

[56] References Cited

UNITED STATES PATENTS

| | | | |
|---|---|---|---|
| 3,278,133 | 10/1966 | Froehlich | 242/68.3 |
| 3,532,286 | 10/1970 | Mallette | 242/68.3 |
| 3,542,305 | 11/1970 | Feierabend | 242/68.3 |
| 3,606,188 | 9/1971 | Wagner | 242/68.3 |

*Primary Examiner*—John W. Huckert
*Assistant Examiner*—Edward J. McCarthy
*Attorney, Agent, or Firm*—Darby & Darby

[57] ABSTRACT

Self positioning of a tape reel on a motor driven reel hub is accomplished by providing a helical coil spring which is partially captured within a groove which extends about the periphery of the hub housing. The coils of the spring are laid in the groove so as to form an angle with the radial axis of the hub housing. The angled coils, which are deflected by passing a tape reel over them, exert a force on the tape reel which by snap action properly positions the reel on the hub.

Latching of a tape reel onto a hub is accomplished by the engagement of a set of pivotally mounted latching elements positioned about the periphery of the hub base by a spring loaded piston element which urges the latching elements into engagement with the inner surface of the tape reel. The two-position (latched and unlatched) actuating lever is controlled by a unique cam element.

4 Claims, 9 Drawing Figures

SELF-POSITIONING REEL LATCHING HUB

The invention described herein relates generally to apparatus for positioning a reel on a rotatable hub and for releasably latching the reel onto the hub.

Various mechanisms have been proposed for use on a magnetic tape transport unit for accurately positioning a reel of tape on the hub of the tape transport unit and for securely latching the reel onto the hub. For example, attention is directed to U.S. Pat. No. 3,542,305 for "Self-Positioning Reel Latching Apparatus" and the several patents mentioned therein.

It is necessary in a tape transport unit that the tape reel be securely latched to the hub to prevent rotational slippage between the reel and the rotating hub. Even a small degree of slippage could prevent the tape transport unit from accurately reading or recording on the tape.

Before a reel can be latched onto a hub, the reel must be positioned on the hub so that the axes of the hub and reel are in alignment and so that the reel is properly axially positioned with respect to the motor shaft so that the tape lies in the proper position to be guided through the information processing station. Otherwise, the reel might not be in position to be securely latched to the hub and the tape might suffer edge damage or be subjected to error causing mislocation.

It is accordingly an object of this invention to provide a self positioning, reel latching hub adaptable for use on a magnetic tape transport unit.

It is a further object to provide a self positioning, reel latching hub in which the tape reel is positively and accurately positioned axially on the hub by snap action.

It is a further object to provide a self positioning, reel latching hub which is simple and quick to operate.

It is a further object to provide a self positioning, reel latching hub having a unique trigger mechanism which controls the position of the hub latching handle.

It is a further object to provide a self positioning, reel latching hub having a plurality of unique latching elements.

Briefly, the hub of the present invention consists of a hub case having a series of pivotally mounted latching elements spaced about its periphery which are actuated into engagement with the inner surface of a reel by a lever or handle on the hub housing. Actuation of the lever causes the latching elements to pivot radially outwardly in order to securely engage the inner surface of the reel. A helical coil spring is positioned between the outer hub housing and the hub base onto which the reel is latched. The helical coil spring is partially captured within the hub housing so that each of the loops of the coil spring is slanted at an angle with respect to the radius of the hub housing. When a reel is placed onto the tapered hub housing, the coil springs deflect radially permitting the reel to be accurately positioned on the hub base. As the reel is manually pushed further onto the hub base, the radially deflected coil springs exert a positive axial force on the reel with a snap action which automatically positions or snaps the reel in proper position for latching.

Other objects and advantages of the present invention are explained in the following specification, considered together with the accompanying drawings, in which FIG. 1 is a perspective view of the hub of the present invention;

Figure 1:
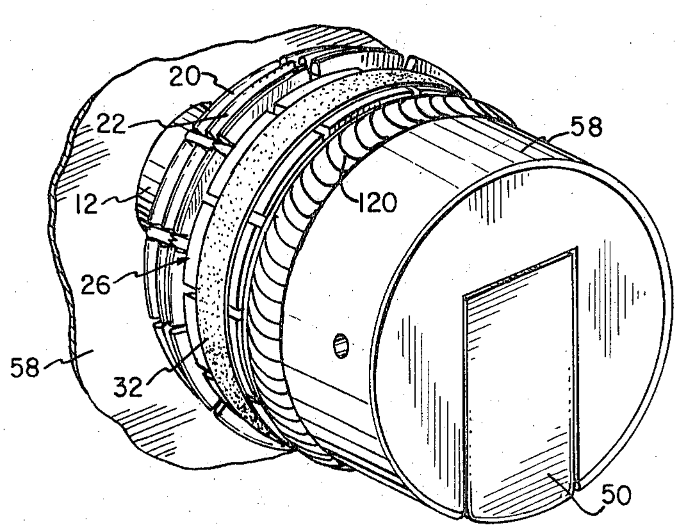
Figure 2:
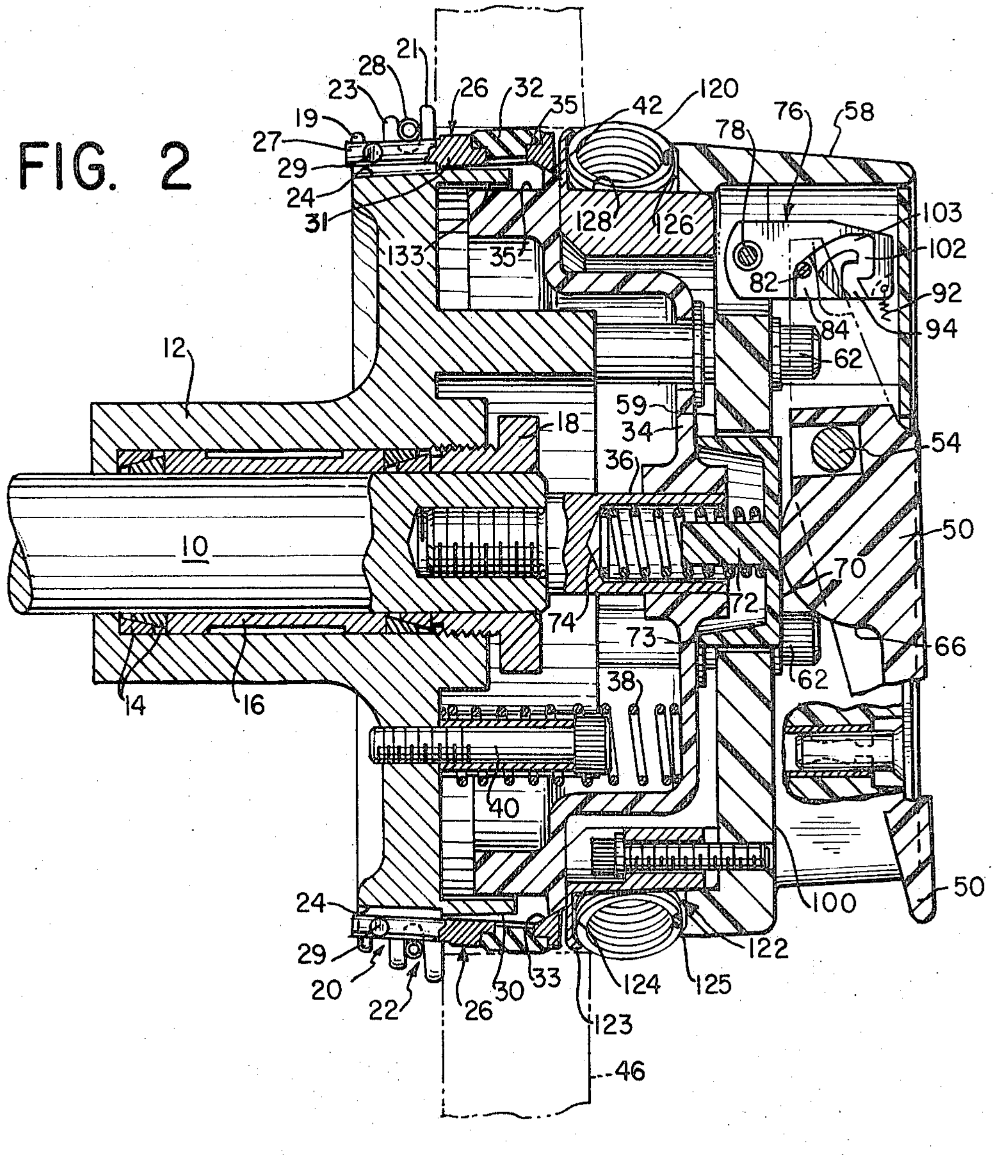
FIG. 2 is a side cross-sectional view of the hub illustrated in FIG. 1 in a latched position.

Referring now to FIGS. 1 and 2, the hub of this invention consists essentially of a hub base 12 and a hub housing 58. The hub base 12 is attached to the rotatable motor shaft 10 of a magnetic tape transport unit (not shown). Rotation of the motor shaft, of course, causes rotation of the hub base and the reel mounted on the hub base. The hub base is attached to the motor shaft by adjustable bushings 14, spacer 16 and nut 18, as best illustrated in FIG. 2.

Figures 3, 4:
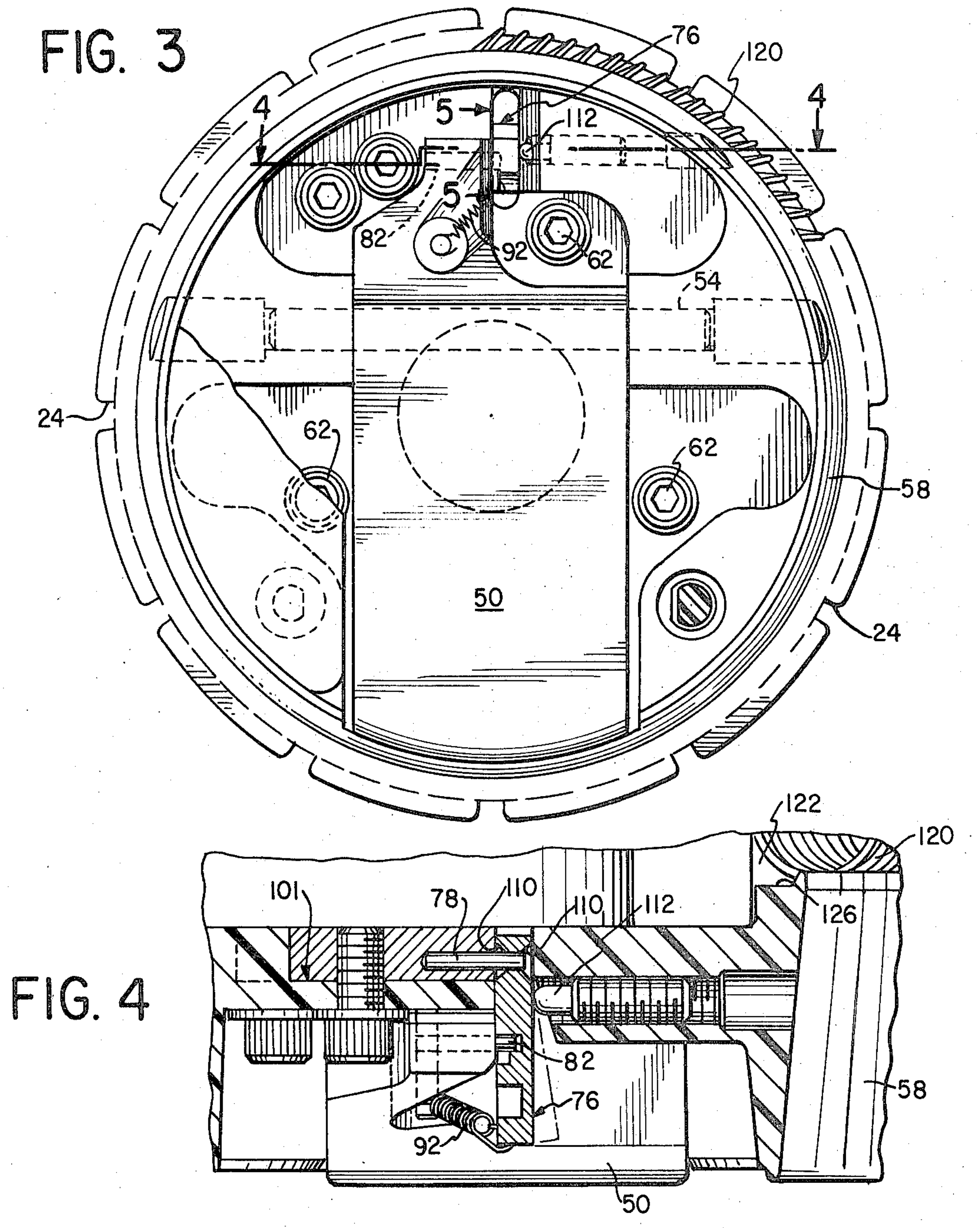
FIG. 3 is a front cross-sectional view of the front of the hub illustrated in FIG. 1.
FIG. 4 is a top cross-sectional view of the hub illustrated in FIG. 3, taken along the line 4—4.

Two annular grooves 20 and 22 are formed in the outer surface of the hub base 12 and extend about its periphery. Groove 20 is formed between hub base walls 19 and 23, and groove 22 is formed between hub base walls 21 and 23. As best illustrated in FIG. 3, twelve radially extending slots 24 are formed in the hub base walls 19, 21 and 23. The radially extending slots 24 in each of the walls 19, 21 and 23 are coextensively aligned. The slots 24 are equally spaced about the periphery of each of the hub base walls 19, 21 and 23.

Figures 6, 7, 8, 9:
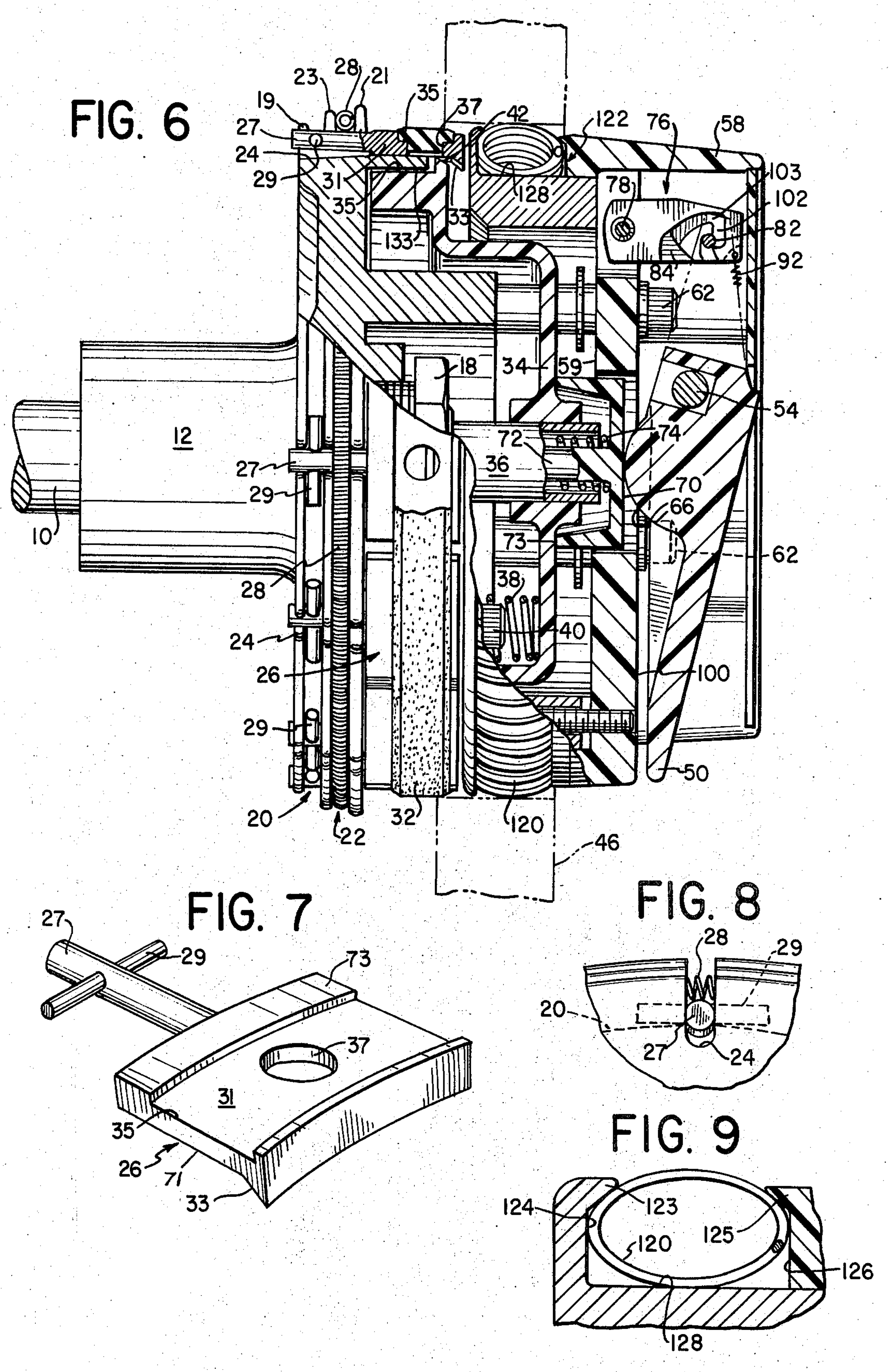
FIG. 6 is a cross-sectional view, similar to the view illustrated in FIG. 2, of the hub illustrated in FIG. 1 in the unlatched position.
FIG. 7 is a perspective view of a latching element.
FIG. 8 is a partially broken away rear view of the hub base.
FIG. 9 is a partially broken away enlarged cross-sectional view of the coil spring within the hub housing.

Referring now to FIG. 7, each of the latching elements 26 consists of a first shaft 27, a second shaft 29 which is of smaller diameter than the first shaft 27 and which extends through the first shaft at a right angle, and a base portion 31.

The latching element first shaft 27 is adapted to fit within the radial slots 24 which are formed in hub base walls 19, 21 and 23 and to extend the distance between the three walls as best illustrated in FIGS. 1 and 2. As illustrated in FIG. 8, the base of each of the slots 24 in walls 19, 21 and 23 generally is coincident.

The latching element second shaft 29 is adapted to fit within the hub base first annular groove 20. As best illustrated in FIG. 2, the depth of groove 20 is greater than the depth of groove 22 (as measured from the top of hub base wall 23 which is common to both grooves). A garter-type spring 28 is positioned about the hub base second annular groove 22 so that it engages the top surface of the latching element first shaft 27 in order to force the latching elements radially inwardly and retain all the latching elements in an assembled fashion. The combination of the groove 20, the slots 24 and the spring 28 enable each of the latching elements 26 to be pivotally mounted in groove 20.

The latching element base portion 31 consists of a cylindrical segment whose top and bottom surfaces are parallelly curved so that the bottom surface snugly engages the outer cylindrical surface 30 of the hub base. This surface may also be slightly tapered rather than being cylindrical. A camming surface 33 is formed on the outermost edge of the latching element base portion bottom surface 71. The camming surface 33 extends downwardly from the base portion bottom surface as illustrated in FIG. 7. In position on the hub base, the latching element bottom surface 71 extends beyond the end edge of the hub base outer surface 30. A groove 35 is formed in the top surface 73 of each of the latching elements 26. A cylindrical cavity 37 is formed through each latching element top surface 73. An elastic band 32 is adapted to be positioned in the latching element grooves primarily to provide friction for the inside diameter of the reel and also to urge the latching element base portions 31 radially inwardly so that the bottom surfaces of the latching element base portions directly engage the hub base cylindrical outer surface 30. An integrally molded elastic boss (not shown) formed on the inside surface of the elastic band 32 is adapted to fit within the cavity 37 in each of the latching elements to prevent slippage of the elastic band. The width of the elastic band is approximately equal to the width of the latching element groove 35.

When the tape reel 46 is properly positioned on the hub, the rear surface of the reel 46 contacts the front surface of wall 21, as illustrated in FIG. 2. (Throughout this description, when the terms "front," "forward" and "rear" are used, "front" and "forward" means facing or in the direction of the right-hand side of FIG. 2, and "rear" means facing or in the direction of the left-hand side of FIG. 2.)

Piston element 34 is interposed between the hub base 12 and the hub housing 58. The piston element 34 is generally cup-shaped. It is slidably mounted on a hollow guide shaft 36 whose base is screwed into the motor shaft 10. The piston element is adapted to move horizontally along the guide shaft 36. The outermost cylindrical surface 35 of the piston element 34 is adapted to clear the inner cylindrical surface 133 of the hub base.

At the frontmost end of the piston outer cylindrical surface 35, a bevelled surface 42 is formed which is adapted to cooperate with the camming surface 33 which is formed on the bottom surface of each of the latching elements 26.

Thus, as the piston member 34 moves forwardly (that is, to the right) from the unlatched position illustrated in FIG. 6 to the latched position illustrated in FIG. 2, the piston element bevelled surface 42 engages each of the latching elements camming surfaces 33 causing each of the latching elements to pivot upwardly or radially outwardly about the second shaft 29. When the tape reel is properly positioned on the hub, this causes the base portion of each of the latching elements to move nearly radially outwardly a sufficient degree to directly engage via the high friction elastic ring 32, the inner peripheral surface of the reel hub and lock the hub securely in place.

As the piston element 34 moves rearwardly (or to the left) from the latched position illustrated in FIG. 2 to the unlatched position illustrated in FIG. 6, the bevelled surface 42 of the piston element moves out of engagement with each of the latching element camming surfaces 33. The quarter spring 28 and elastic band 32 causes the latching elements to pivot downwardly or radially inwardly about the second shaft 29. This results in each of the latching elements (and the elastic band 32 which lies in them) moving out of engagement with the inner peripheral surface of the tape reel thereby releasing the high friction gripping action and permitting the reel to be removed freely from the hub.

The piston element 34 is normally urged forwardly into the latched position by three springs 38 which are spaced about the periphery of the hub base 12. The springs are mounted on jacketed studs 40 which are screwed into the front surface of the hub base. The spring elements 38 push outwardly against the rear surface of the piston element thereby urging the piston element forwardly.

The hub base 12 and the hub housing 58 are interconnected by a series of studs 62 which extend outwardly from the front surface of the hub base 12, and which are slidably disposed through piston element 34 and which are attached to the rear surface 59 of the hub housing 58. The piston element 34 is movable horizontally along the stud 62.

The horizontal movement and ultimate position of the piston element 34 along the guide shaft 36 is controlled by the movement and position of the actuating lever 50. Actuating lever 50 is pivotally mounted on supporting pin 54 in the hub housing. A rounded boss 66 is formed on the rear surface of the actuating lever. The rounded boss is adapted to engage a cup element 70 having a locating stud 72 extending rearwardly from the cup rear surface into the hollow guide shaft 36. A coil spring 74 which is housed within the hollow guide shaft 36 surrounds the locating stud 72 so that the frontmost portion of the coil spring bears against the inner rear surface of the cup element 70. The coil spring 74 serves to urge the cup element forwardly. The outermost extremities 73 of the cup element directly engage the front surface of the piston element 34.

When the actuating lever 50 is pivoted inwardly or rearwardly, the rounded boss 66 formed on the rear surface of the lever bears against the cup element 70 and pushes it rearwardly thereby causing the piston element 34 to move rearwardly along the guide element 36. As previously explained, the rearward movement of the piston element forces the piston bevelled surface 42 and each of the latching element camming surfaces 33 out of engagement with one another so that the latching elements pivot downwardly and out of locking engagement with the inner peripheral surface of the tape reel. This unlatched position is best illustrated in FIG. 6 which shows the actuating lever 50 in its inward or rear position, the cup element 72 in its inward or rear position, the piston element 34 in its inward or rear position, and the bevelled edge of the piston element and the retaining element camming surfaces out of engagement with one another.

When the actuating lever 50 is pivoted outwardly or forwardly, the lever rounded boss 66 moves outwardly and is followed by the cup element 70 which is urged outwardly by the coil spring 74. When the cup element moves outwardly, the piston element 34 is free to be urged outwardly by the springs 38 so that the piston element bevelled edge 42 moves into engagement with the latching element camming surfaces 33 and the latching elements pivot upwardly into locking engagement with the tape reel inner surface.

Figure 5:
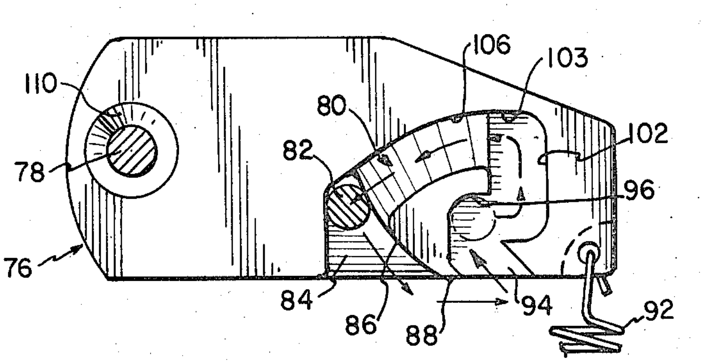
FIG. 5 is a cross-sectional view of the trigger element illustrated in FIG. 3 taken along the line 5—5.

Another aspect of this invention relates to the cam element 76 which permits the actuating lever 50 to be stable in its inward or rear position in which the latching elements are disengaged or unlatched and in its outer or forward position in which the latching elements are engaged or latched. Cam element 76 is pivotally mounted on the hub housing by pin 78. The cam element, which is best illustrated in FIG. 5, consists of a generally rectangular element having an arcuate groove of different depth levels formed on one of its lateral surfaces. The arcuate groove 80 is directly engaged by a lever pin 82 which extends laterally outwardly from the top portion of the actuating lever 50.

In FIG. 5, the actuating lever pin 82 is shown in the engaged or latched position by the cross hatched element and in the non-engaged or unlatched position by the non-cross hatched element. Beginning with the latched position, the lever pin 82 is shown in a first groove 84 which is generally triangular in shape and which is of uniform depth. In order to unlatch the hub mechanism, the base of the actuating lever is pushed inwardly or rearwardly. This causes the lever pin 82 to move outwardly (or forwardly) in an arcuate path since it is rotating about the lever central pivot 54. Since the cam element 76 is pivotally mounted about cam pin 78, it rises upwardly as the lever pin 82 moves forwardly in an arcuate path because the lever pin 82 engages the cam wall 86 which forms one boundary of the cam groove 84. The arrows in FIG. 5 indicate a direction of travel of the pin if it were assumed that the camming element remained stationary. However, in actuality, the camming element and the lever pin both move together.

The camming element continues to rise upwardly in response to the forward movement of the lever pin 82 until the pin passes over the wall 88 which separates groove 84 from groove 94 which is positioned forwardly from groove 84. The camming element end opposite its pivot end has a spring 92 attached to it. The spring is anchored on the hub housing. As the lever pin 82 passes the wall 88 in its arcuate path of travel, the spring 92 pulls the camming element downwardly on the lever pin so that the lever pin is forced into groove 94 and directly engages the top portion of wall 96 which is generally C-shaped. Groove 94 is formed such that the base of the actuating lever can be pushed inwardly or rearwardly as far as possible and the retaining element will be captured within groove 94 and be directly engaged by the top portion of wall 96. In this unlatched position (which is illustrated in FIG. 5 by the non-cross hatched lever pin 82), the piston bevelled edge 42 and the latching element camming surfaces 33 are out of engagement with one another.

In the unlatched position of the lever pin 82 in the groove 94 illustrated in FIG. 5, the bottom portion or base of the actuating lever is slightly spaced from the hub housing front wall 100. Thus, even if the bottom portion of the actuating lever is pushed inwardly or rearwardly as far as possible against the hub housing front wall 100 in order to unlatch the hub mechanism, the bottom portion of the lever snaps slightly outwardly or forwardly because of the shape of groove 94.

In order to actuate the latching elements into engagement with the inner surface of a tape reel, the bottom portion of the actuating lever is pushed inwardly or rearwardly as far as possible toward the hub housing front wall 100. This causes the lever pin 82 to travel in a clockwise arcuate path out of engagement with the top portion of wall 96. At the same time that the lever pin moves out of engagement with the top portion of wall 96, the spring element 92 pulls the camming element downwardly so that the lever pin moves into and through groove 102 in the camming element. Groove 102 is generally reverse C-shaped and is of uniform depth.

At this point, the bottom portion of the actuating lever has a small clearance with the inner hub housing front wall 100 and the lever pin 82 is engaging the top portion of wall 103 which forms groove 102. When the bottom portion of the actuating lever is released, pin 82 is no longer being constrained by the cam element 76 so that the lever rotates fully about pivot 54 allowing the three compressed springs 38 which are illustrated in FIG. 6 push the piston element outwardly or forwardly against the cup element and the spring element 74 pushes the cup element outwardly against the rounded boss formed on the inside of the actuating lever providing a thrust which pushes the lever outwardly to the flush position illustrated in FIG. 2.

When this occurs, the lever pin 82 moves in an arcuate counterclockwise path about the central pivot 54 into groove 106 of the cam element. The depth of groove 106 gradually decreases from the uniform depth of grooves 84, 94 and 102 as the pin progresses in a counterclockwise direction along groove 106. Since the lever pin is rigidly mounted, the cam element moves horizontally in a direction away from the lever pin. As the lever pin passes the wall 86 which is the outermost extremity of the groove 106 and one boundary of the groove 84, the lever pin drops into groove 84 and the camming element moves horizontally towards the pin. Since the groove 84 has greater depth than the end portion of groove 106, wall 86 forms a boundary which traps the lever pin 82 in the latched position illustrated in FIG. 5 by cross hatching.

As previously mentioned, the camming element 76 is pivotally mounted on a pin 78. Referring now to FIG. 4, the cam pin 78 is supported in a metal plate attached to the rear wall 101 of the hub housing. The two lateral sides of the cam element 76 each have a countersunk wall 110 which permits the cam element to move both vertically and horizontally as is required by the decreasing depth of the cam element groove 106. A spring loaded plunger 112 is mounted in the hub housing in order to engage the side of the cam element which moves laterally outwardly as the lever pin progresses within the groove 106. The spring plunger 112 pushes the cam element laterally inwardly when the lever pin has passed wall 86 and drops into groove 84. The lateral movement of the cam element 76 is illustrated in FIG. 4 in dotted lines.

Another aspect of this invention relates to a device for properly positioning the tape reel on the hub prior to the actuation of the latching elements. If the reel was not properly axially positioned before latching, the tape being unwound from the reel would lie in a plane which would not meet the edge guidance requirements for moving the tape past the read-write head in the correct lateral position. Also, it is difficult to determine visually when the tape reel is in proper position on the hub so that the latching elements can be actuated.

In order to insure that the reel is properly positioned before the latching elements are actuated, the hub of the present invention provides an ordinary helical coil spring 120 which is captured or retained in the hub housing in groove 122. The coil spring is made endless by joining its free ends. The groove 122 is formed of a hub housing rear wall 124 and a hub housing front wall 126. The spring elements directly engage the rear wall 124 and the bottom wall 128 of the groove 122. The top portion of the rear wall 124 has a slight bend or detail 123 which engages a portion of the coil spring. The front wall 126 has a rearwardly extending top portion or detail 125 which also engages the coil spring. The coil spring is angled within groove 122 so that the loops or coils of the coil spring can be radially deflected one atop the other. Details 123 and 125 capture the angled spring in the groove, as seen in FIG. 9. This is accomplished moving rear wall 124 and detail 123 relative to wall 126 and detail 125 while the spring is held in an angled position.

In a specific embodiment of the coil spring 120, the spring is toroid-shaped and has a free length of approximately 5.5 inches. The spring is fitted in groove 122 which has a diameter of approximately 3.10 inches. Each of the coils comprising the spring has a diameter of approximately 0.5 inches and a thickness of approximately 0.032 inches. In this specific embodiment, the coil spring consists of 105 to 110 separate coils. Each of the coils is laid into the groove 122 at an angle of approximately 40° with the hub housing radius. The coils are captured within the grooves 122 by walls 124 and 126 so that the outside diameter of the deflected coil spring is approximately 3.75 inches. The wall 124 is approximately 0.5 inches in height. The slight bend 123 in the rear wall 124 flares forwardly, as illustrated in FIG. 2, at an angle of approximately 45° for a horizontal distance of approximately 0.05 inches. The outside diameter of the rear wall 124 is approximately 3.675 inches and the inside diameter (measured at the juncture of the rear wall 124 and the bottom wall 128) is approximately 3.175 inches. The front wall 122 is approximately 0.481 in height. The rearwardly extending top portion 125 flares rearwardly, as illustrated in FIG. 2, at an angle of approximately 45° for a horizontal distance of approximately 0.05 inches. The outside diameter of the front wall 122 is approximately 3.57 inches and the inside diameter is approximately 3.089 inches. The groove bottom wall 128 tapers forwardly from a diameter of 3.175 inches at the junction of rear wall 124 and bottom wall 128 to a diameter of approximately 3.089 at the junction of front wall 122 and bottom wall 128. The width of bottom wall 128 is approximately 0.525 inches.

Accordingly, when a tape reel is placed on the hub, the reel radially deflects the loops of the helical coil spring and passes over it. By radial deflection, it is meant that the deflection takes place along a line coincident with the generally cylindrical hub housing on which the spring is mounted. However, after the inner peripheral surface of the tape reel has passed over the deflected helical coil spring and the deflected coil spring begins to escape at the front of the reel, the coil spring loops exert a force on the tape reel which causes the tape reel to snap toward the rear into its proper position on the hub. This snap action provided by the deflected helical coil springs causes an audible sound which assures the operator that the reel is properly positioned on the hub. Th snap action of the helical coil spring results from the expending of the stored energy which is induced in the deflected coil spring by virtue of the tape reel being pushed onto the coil spring.

Under average conditions of loading, the seating force exerted by the coil spring on the reel is exerted over 360° of the reel.

While the invention has been particularly shown and described with reference to a specific embodiment, it will be understood by those skilled in the art that various changes in form and details may be made without departing from the spirit and scope of the invention. Referring to the preceding paragraph, once a portion of the spring escapes to in front of the reel hub in any peripheral zone, the escaping action tends to precess automatically around the remainder of the spring, thereby causing the reel to seat with greatly decreased manual assistance.

What is claimed is:

1. Apparatus for axially positioning and latching a reel comprising:

a hub base onto which the reel is to be placed, said hub base including a generally cylindrical first outer wall;

a plurality of cylindrical segments positioned about the periphery of said first outer wall, each of said cylindrical segments being pivotally mounted on said hub base, a first portion of each of said cylindrical segments extending outwardly beyond the end edge of said first outer wall, the bottom surface of each said cylindrical segment first portion having a downwardly depending first camming surface formed thereon, a generally cylindrical piston member positioned directly adjacent and in axial alignment with said hub base outer wall, said piston being slidably mounted for movement toward and away from said hub base, said piston member including a generally cylindrical second outer wall, a second camming surface being formed on said second outer wall, said second camming surface extending upwardly from said second outer wall, means for engaging and moving said piston member towards said hub base, said engaging and moving means being manually actuable and including a generally cylindrical hub housing positioned directly adjacent and in axial alignment with said piston member, a lever being pivotally mounted on said hub housing; said lever having a first stable position and a second stable position, and means mounted on said housing for determining said lever stable positions.

2. The apparatus recited in claim 1, said means for determining said lever stable positions comprising a cam element, said cam element being mounted on said hub housing for vertical and horizontal movement and being positioned above said lever pivot, said cam element being generally rectangular and having arcuately shaped grooves, a pin member extending outwardly from said lever and into said cam element grooves.

3. The apparatus recited in claim 2, said arcuately shaped grooves comprising a first groove being partially formed by a first groove wall, a second groove being partially formed by a second groove wall, and a third groove connecting said first and second grooves, said third groove having a gradually decreasing depth with increasing nearness to said first groove whereby said lever pin abutting against said first groove wall determines said lever first stable position and said lever pin abutting against said second groove wall determines said lever second stable position.

4. The apparatus recited in claim 1, said hub housing including a generally cylindrical front wall and rear wall, a channel being formed between said hub housing front and rear walls, an endless helical spring being positioned in said channel, each of the coils of said spring being angled in said channel, details being formed on said housing front and rear walls, said details extending inwardly toward said channel, said details engaging and retaining said spring within said channel, whereby said spring is further angled by the reel being placed over it and said spring exerts a seating force on the reel to properly axially position the reel on the hub base.

* * * * *